US006068172A

United States Patent [19]

Huber

[11] Patent Number: 6,068,172

[45] Date of Patent: May 30, 2000

[54] DEVICE FOR TRANSPORTING AND TEMPORARILY STORING A WEB-LIKE RECORDING MEDIUM IN AN ELECTROGRAPHIC PRINTER OR COPIER

[75] Inventor: Markus Huber, Markt Schwaben, Germany

[73] Assignee: Oce Printing Systems GmbH, Poing, Germany

[21] Appl. No.: 09/072,698

[22] Filed: May 6, 1998

[30] Foreign Application Priority Data

Nov. 14, 1997 [DE] Germany ........................ 297 20 235 U

[51] Int. Cl.[7] ............................ B65H 20/24; B65H 23/16

[52] U.S. Cl. .......................... 226/118.3; 226/34; 226/155

[58] Field of Search ................................ 226/118.3, 117, 226/121, 155, 34

[56] References Cited

U.S. PATENT DOCUMENTS

| | | | |
|---|---|---|---|
| 3,087,663 | 4/1963 | Anderson | 226/118.3 X |
| 3,904,145 | 9/1975 | Steinberger et al. . | |
| 3,998,368 | 12/1976 | Hackney | 226/117 X |
| 4,657,164 | 4/1987 | Felix . | |
| 5,031,847 | 7/1991 | Tanaka | 226/118.3 X |
| 5,480,085 | 1/1996 | Smithe et al. | 226/118.3 X |

FOREIGN PATENT DOCUMENTS

| | | |
|---|---|---|
| 70 458 | 7/1969 | Germany . |
| 41 28 860 A1 | 3/1993 | Germany . |
| 41 39 101 A1 | 6/1993 | Germany . |
| 41 07 799 C2 | 4/1995 | Germany . |

*Primary Examiner*—Michael R. Mansen
*Attorney, Agent, or Firm*—Hill & Simpson

[57] ABSTRACT

In a device for transporting and temporarily storing a web-like recording medium in an electrographic printing or copying device, the recording medium is fed with a roller arrangement to a temporary storage unit by use of friction. A loop forming in the temporary storage unit is adjusted by a pendulum. When the pendulum is nearing a vertical position, tension on the recording medium is decreased to such an extent that the roller arrangement feeding the recording medium no longer has frictional driving engagement with the recording medium so that feed of the recording medium substantially ceases. When the pendulum is moved away from the vertical position towards a horizontal position as a result of the loop in the temporary storage unit being decreased, tension stress in the recording medium increases and frictional engagement at the roller arrangement increases so that the recording medium is then fed by the roller arrangement.

11 Claims, 4 Drawing Sheets

1 8 24 28 25 27 5 6 7 20 9 3 β 4 15 16 26 12 21 AP 22 14 2 A α 11 γ 10 RP 17 13 19 18 23

1
2
3
4
5
6
7
8
9
10
11
12
13
14
15
16
17
18
19
20
21
22
23
24
25
26
27
28
A
AP
RP
α
β
γ

DEVICE FOR TRANSPORTING AND TEMPORARILY STORING A WEB-LIKE RECORDING MEDIUM IN AN ELECTROGRAPHIC PRINTER OR COPIER

BACKGROUND OF THE INVENTION

The invention relates to a device for transporting and temporarily storing a web-like recording medium in an electrographic printer or copier.

Such a device is taught in DE 41 077 99 C2, for example. The recording medium of paper is transported there by friction from an input station into the interior of the device via a roller system with a driven roller. A driving mechanism is provided there with which the recording medium is transported to a transfer printing station.

In the known arrangement, a decoupling of the drive mechanism at the input side from the drive mechanism of the recording medium in the printer is further provided. Fluctuations arising at the input drive mechanism or at the internal printing drive mechanism are thus picked up to a certain extent. Such a decoupling is necessary, particularly when another device is connected to a printer upstream, for example, of a first printer which prints the reverse side of an continuous paper web and feeds this paper web to the second printer, which prints the reverse side. A paper changing station is then introduced in the paper web between these two printers.

In printing situations wherein large speed differences occur within a short time, the known arrangement has the disadvantage that the jolt buffer only cushions hard jolts which would result in a tearing of the paper. Jolts which do not activate the jolt buffer exert a full effect on the paper web. A not inconsiderable portion of impact forces act therewith not only on the paper web, but also on the remaining components which drive the paper web.

The disadvantage just described adversely affects the printing quality if the impact forces are manifest up into the region of the transfer printing station. There they effect displacements of the printing image. Such displacements are not acceptable. This effect can arise, on the one hand, in extreme start or stop situations in which high acceleration forces act on the paper web, and on the other hand, when a prescribed paper transport unit is to be utilized in a printer, this printer producing a new, higher resolution in the region of the transfer printing station. The thinner and thus lighter the respectively utilized paper is, the more negative is the effect which the jolts created by a given paper transport have on the printing quality.

SUMMARY OF THE INVENTION

It is an object of the invention to propose a device for transporting and temporarily storing a web-like recording medium in an electrographic printer or copier, with which an optimally jolt-free transport of the recording medium is possible.

According to the present invention, a device is provided for transporting and temporarily storing a web-like recording medium and a printing or copying device. A first conveyance unit transports the recording medium from the first conveyance unit to a temporary storage unit, and a drive mechanism removes the recording medium from the temporary storage unit. The first conveyance unit and the temporary storage unit are constructed so as to mechanically cooperate with each other such that a control quantity of the temporary storage unit depends on a storage load collected in the temporary storage unit. A rate of conveyance of the first conveyance unit depends on the control quantity which acts on the first conveyance unit from the temporary storage unit.

The temporary storage unit, variable mechanical control unit, and variable conveying unit are provided according to the invention cooperate mechanically such that a mechanical control quantity depends on the storage load collected in the temporary storage unit. Specifically, the control quantity therein depends on the storage load in an inversely proportional fashion; i.e. the larger the storage load is, the control quantity is that much smaller. The control quantity created by the control unit acts on the conveyance unit, whose rate of conveyance depends on the control quantity. In particular, the tensile force is transferred directly from the recording medium; the control quantity is specifically a tensile force; and the control unit is specifically a tensile force unit.

In an embodiment of the invention, the recording medium—which can be a paper web, in particular—is fed with a roller arrangement to a temporary storage unit by means of friction, wherein a loop forming in the temporary storage unit is adjusted by a pendulum. The pendulum therein automatically creates—via its angle excursion—a tensile stress in the recording medium which stress becomes that much larger, the smaller the storage unit contents are. Since the roller arrangement transports the recording medium via friction, a higher stress in the recording medium effects less slippage and thus a higher rate of conveyance. On the one hand, the friction connection automatically breaks when the temporary storage unit is filled to a prescribed maximum load. This prevents the storage unit from being filled any further. The roller arrangement therein rotates. In particular, it is formed of two rollers which do not touch one another and which are surrounded by the recording medium in an S-shaped fashion.

The recording medium is therefore fed to the internal printing drive mechanism by the roller arrangement according to need, wherein a certain maximum storage load in the storage unit is not exceeded.

The pendulum and the roller arrangement remain in active connection, such that, given an excursion of the pendulum out of its resting position, a tensile force is exerted on the recording medium, whereby the friction connection between recording medium and roller arrangement is produced.

With the achievement of the prescribed maximal filling level, a loose loop forms in the temporary storage unit; and the pendulum simultaneously assumes its resting position and thus prevents a further conveyance of the recording medium at the input side.

A drive mechanism is provided after the temporary storage unit in the paper transport direction which feeds the recording medium to a transfer printing station in a press-related manner. Along with the temporary storage unit, this drive mechanism is decoupled from the roller arrangement at the input side.

Motors are provided for the roller arrangement and the drive mechanism in the region of the printing transfer station, wherein the speed acting on the roller arrangement is greater than the maximum speed effected on the drive mechanism of the transfer printing station.

Accelerating forces or jolts regularly act upon the paper web in a running printing operation which can come from a preprocessing device, from a roller pair at the input side and from driving toward the temporary storage unit. The paper web is accelerated with high forces particularly in a start phase before the printing. Although the pendulum already effects a harmonization of the force curve in accelerations or a cushioning of hard jolts in the recording medium, an additional buffer can be advantageous with which jolts arising in excess swinging of the pendulum are cushioned.

DESCRIPTION OF THE PREFERRED EMBODIMENTS

Figure 1:
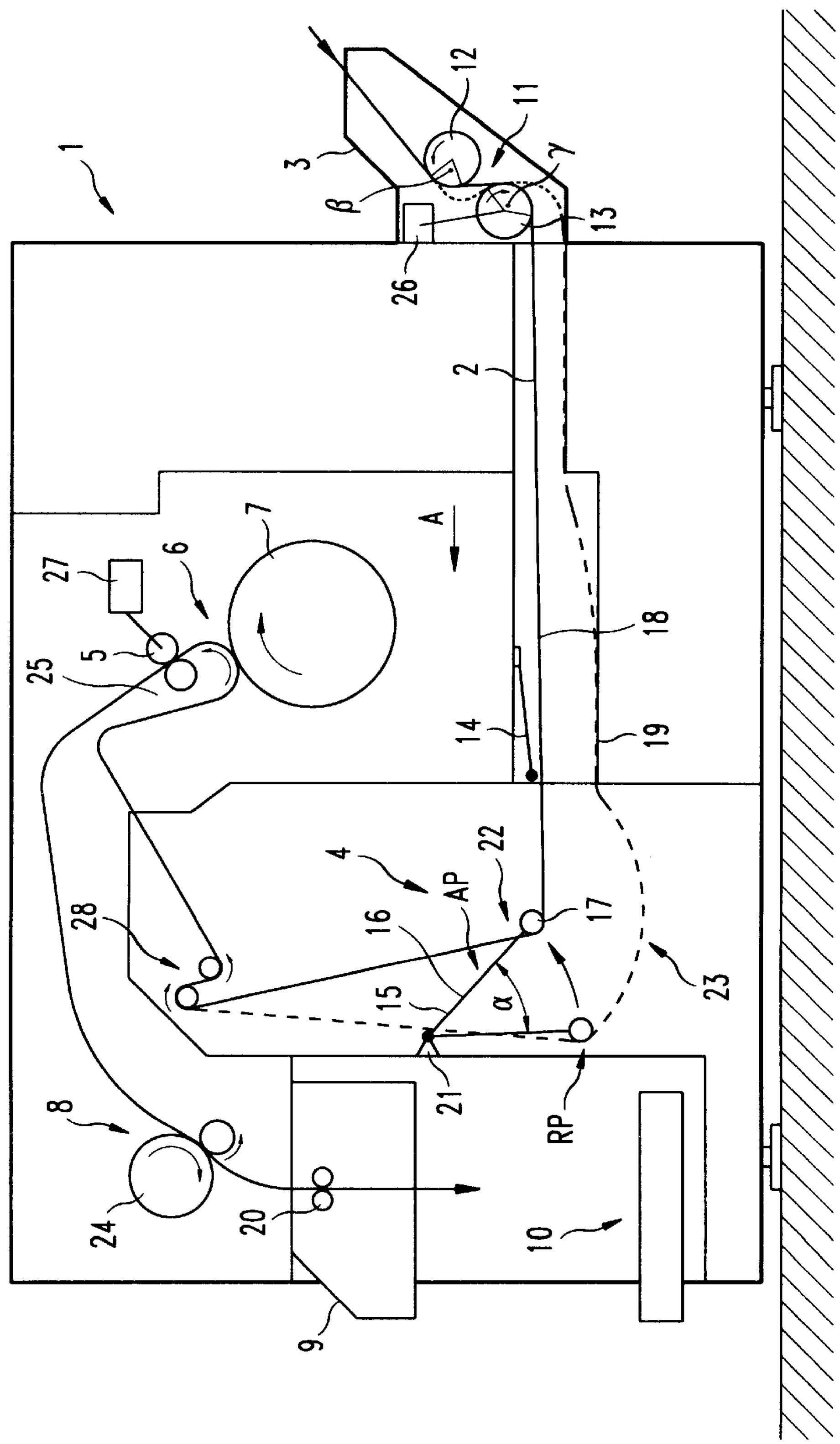
FIG. 1 is an electrophotographic printer.

FIG. 1 depicts an electrophotographic printer 1 to which a web-like recording medium in the form of a continuous paper web 2 is fed via a paper feed 3. The incoming paper web 2 can therein be selectively taken from a supply stack of prefolded continuous paper, drawn from a paper roll or taken form the output of a preparatory device, for example from a preprocessing printer.

Within the electrophotographic printer 1, the paper web 2 is fed to a temporary storage unit 4, in which the paper web 2 forms a loop 23. A drive mechanism 5 conveys the paper web 2 from the paper storage unit 4 to the transfer printing station 6 of the printer 1 via auxiliary rollers 28. For this purpose, the drive mechanism comprises a drive motor 27. In the region of the transfer printing station 6, the paper web 2 is guided via a printing unit 25 which is mounted such that it can be swivelled from the photoconductor drum. A temporary toner image is created on a photoconductor drum 7, and this image is transferred in the printing transfer station 6 to the paper web 2. The paper web 2 which has been impressed with the toner image is then fed to a fixation station 8 in which the toner image is fixated on the paper web 2. In the fixation station 8, a drive roller pair 24—formed of a driven, heated friction roller and a press roller—moves the paper web 2. From there, the paper web 2 is fed to a paper draw 9 which deposits the created paper in a paper stack 10. A roller pair 20 therein transfers the forward feed force onto the paper web 2. Instead of depositing the paper, it can, of course, be fed to other post-processing devices, such as a paper cutting unit, an enveloping unit or the like.

The paper feed 3 is formed essentially of a roller pair 11 which contains a first driven roller 13 and a second driven roller 12. The two rollers 12, 13 are driven by a common motor and are mechanically connected by a toothed gear wheel, a belt drive or the like, whereby they move synchronously, but in opposition. Their surfaces are flat and provided with a friction lining (e.g. compact polyurethane PUR), so that, given a certain surrounding by the paper web 2, a frictional force can be transferred thereto. The paper web 2 runs through the roller pair 11 in an S-shaped manner, wherein it surrounds the roller 12 and the roller 13 with angles $\beta$ and $\gamma$ between 10 and 240 degrees. The two rollers 12, 13 thereby transfer a driving force to the paper web 2, whereby this is conveyed in the direction toward the paper storage unit 4. The rollers 12, 13 move with constant speed, wherein a driving force is transferred to the paper web 2 if the paper web lies at the respective roller under a certain tensile stress. As soon as this tensile stress ceases, the rollers 12, 13 spin in a nearly empty fashion and can transfer hardly any driving force onto the paper web 2.

A buffer 14 is arranged behind the paper feed 3 in the paper transport direction A, this buffer cushioning extreme jolt-like stresses on the paper web 2. It is formed of a spring sheet or plate which extends over the whole width of the paper web 2 perpendicular to the paper transport direction A.

Within the paper storage unit 4, a certain paper load can be accepted, in that the paper web 2 forms a loop. The loop formation is decisively affected by a pendulum 15 arranged in the paper storage unit 4. The pendulum 15 includes two pendulum chains 16 which are suspended at a respective mounting point 21 such as to be secured in the housing, as well as a pendulum rod 22 suspended at both its ends at the pendulum chain 21. The paper web 2 is turned around by the pendulum rod 22. In a working position AP the pendulum 15 is outside its resting position RP at an angle $\alpha$ of around 10° to 15°. The paper web 2 thereby forms a loop 18. The restoring force of the pendulum 15 effects a certain tensile stress in the paper web 2, this stress acting in turn on the surface of the drive roller 13 via the paper web 2. The drive roller 13 can thus exert a carrying force on the paper web 2. The working position AP is maintained as long as the drive mechanism 5 removes exactly the same paper load from the paper storage unit 4 as the paper feed 3 conveys in the storage unit 4. As soon as these two conveyance loads differ, the stored paper load changes. The angle excursion of the pendulum 15—and thus the tensile stress in the paper web 2—thus also changes.

For processing in a high-performance printer with conventional continuous paper with a paper weight between 40 and 100 grams per square meter, a pendulum 15 is particularly suitable a pendulum chain 16 of which is about 30 cm. long, and a pendulum rod 22 of which is formed of special steel with a smooth surface, this comprising a weight of around 250 grams. Acceleration forces of the drive mechanism 5 can thus be picked up to within a few newtons, and paper webs can be reliably transported up to about 20 inches (ca. 50 cm.) in width. An acceleration of the paper web 2 from zero to 1 m/s within 150 milliseconds is thus achievable without damaging the paper web 2.

If the drive mechanism 5 removes more paper from the paper storage unit 4 than the paper drive mechanism 3 is conveying at the moment, then the paper load becomes lower, the paper loop 22 becomes smaller, the pendulum 15 performs an excursion to a larger angle $\alpha$, and effects a higher tensile stress in the paper web 2. A higher contact force of the paper web on the roller pair 11 is thereby effected, whereby the two rollers can effect a greater carrying force on the paper web 2 and thus in turn convey more paper into the paper storage unit 4. The two drive rollers 12, 13 are therein driven with a speed which is about 5% greater than the greatest paper speed effected by the drive mechanism 5 for removing the paper from the paper storage unit 4. The conveyance of the paper web 2 through the roller pair 11 occurs via friction. The greater the contact force is of the paper web 2 on the roller 13—and thus also on the roller 12—the stronger the friction is, and the higher the rate of paper conveyance of these two rollers is. The lower the contact force is of the paper web 2 on the two rollers 12, 13, the greater the sliding is between the two rollers 12, 13 and the paper web 2, and the lower the paper conveyance rate effected by the two rollers 12, 13 is.

According to Euler's rope friction formula, the driving force which is transferrable from the two rollers 12, 13 depends exponentially on the wrap-around angle of the paper web around the frictional roller or around the friction rollers, as well as on the coefficient of friction between paper web and friction lining of the rollers and on the prestressing force exerted in the paper web. If this prestressing force approaches zero, then the driven roller cannot transfer any more forward feed force onto the paper web 2.

With the described structure, these relationships can be exploited. If no more paper is taken by the drive mechanism 5 from the paper storage unit 4, the paper storage unit 4 fills up, as long as the pendulum 15 creates a certain tensile force in the paper web 2. This is the case as long as the pendulum 15 is outside the resting position RP at an angle $\alpha>0$. In the filling of the paper storage unit 4, the angle $\alpha$ grows smaller and smaller, until the paper web 2 reaches the position 19 (see dashed line). The paper loop 23 is then loose in the paper storage unit 4; the pendulum 15 is located in the resting position RP with $\alpha=0$ and exerts no more tension force on the paper web 2. The two rollers 12, 13 therefore spin in an empty fashion; that is, they do not transfer any more forward feed force onto the paper web 2. The paper storage unit 4 has therein reached a prescribed filling level which is not exceeded.

Through the cooperation of the pendulum 15 with the roller pair 11 of the paper feed 3, The paper load buffered in the temporary storage unit 4 automatically adjusts to the demand determined by the printing unit 25. The paper load therein will not exceed a certain upper limit in the storage unit 4. The upper limit is therein adjustable via the driving speed of the roller pair 11, via the maximal speed of the drive mechanism 5, as well as via the leverage, weight, and angle ratios of the pendulum 15. The surface coating of the rollers 12, 13 as well as the wrap-around angle prescribed by the roller position also play a part therein.

In sum, the arrangement enables a feeding of the paper to the print station 25 appropriate to need, wherein the paper feed 3 is in the position—via an appropriate wrap-around angle—to exert high friction forces on the incoming paper web 2. This is especially advantageous when the paper web 2 must be drawn from a preprocessing device, or respectively, from passive, non-driven elements of the preprocessing.

The paper conveyance rate is therein automatically adjusted according to need. The controlling effect of the pendulum 15 is therein achieved until the pendulum has reached a maximum excursion angle of $\alpha=90°$. A high friction force can be subsequently achieved through the spring effect of the buffer 14, whereby the maximum conveyance load of the two drive rollers 12, 13 can be achieved.

Figure 2A:
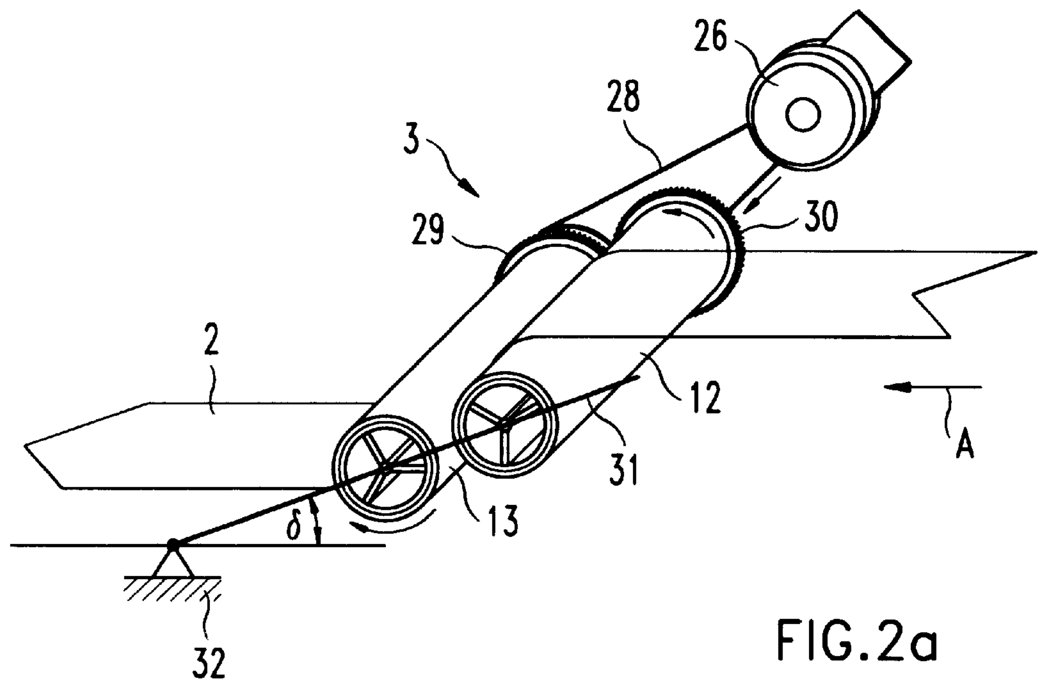
FIGS. 2*a* and 2*b* illustrate a feeding of paper of the printer at the input side.

FIG. 2*a* depicts the paper feed 3 in detail. The drive motor 26 drives a toothed belt 28, which in turn drives the roller 13. The roller 13 transfers the driving momentum to the roller 12 via the toothed gear wheels 29 and 30.

Figure 2B:
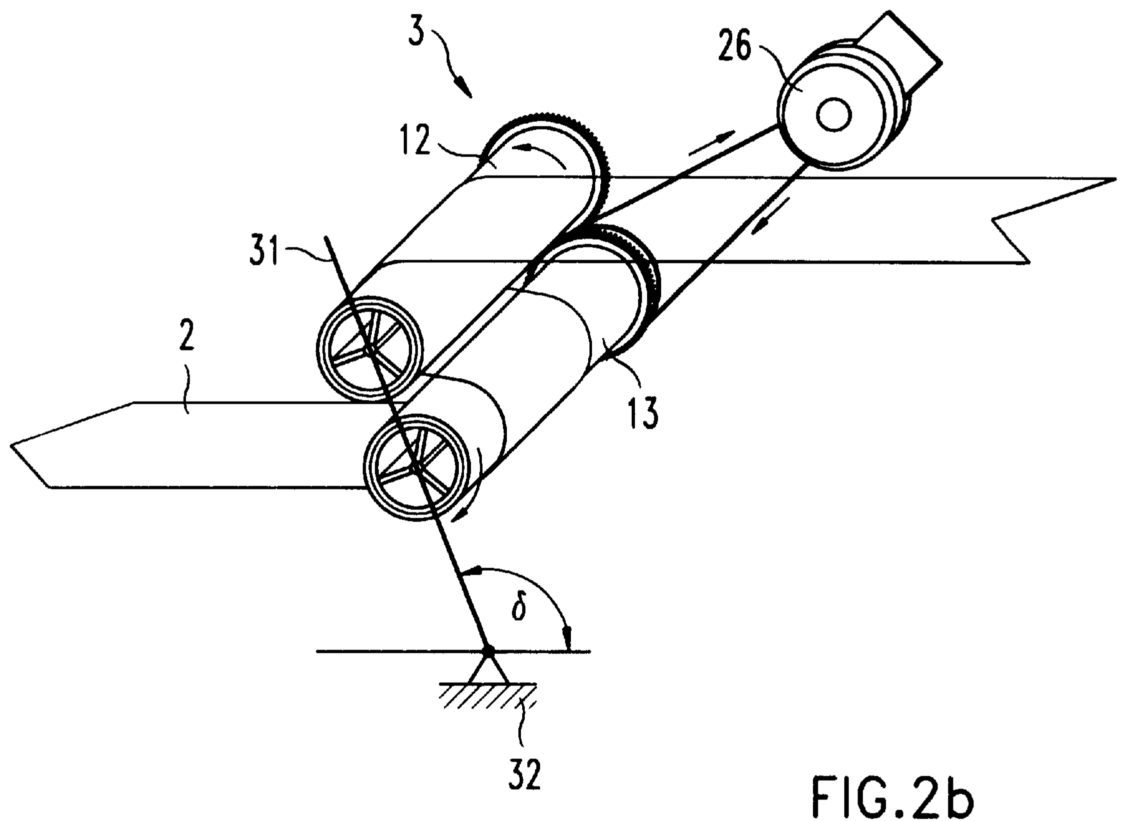

The paper feed 3 is continuously adjustable with a displacement lever 31 at an angle $\delta$ relative to an axle fixed in the housing. The wrap-around angles $\beta$ and $\gamma$ of the paper web 2 around the two drive rollers 12, 13 also change with the angle $\delta$. Thus, the conveyance rate of the paper feed 3 can be adjusted: the greater the angle $\delta$ is, the greater the rate of conveyance is, given a certain tensile force of the paper web. In the position of the paper feed 3 shown in FIG. 2*a*, the angle $\delta$ is 10 degrees, for example; in the position depicted in FIG. 2*b*, it is 100 degrees.

Figure 3:
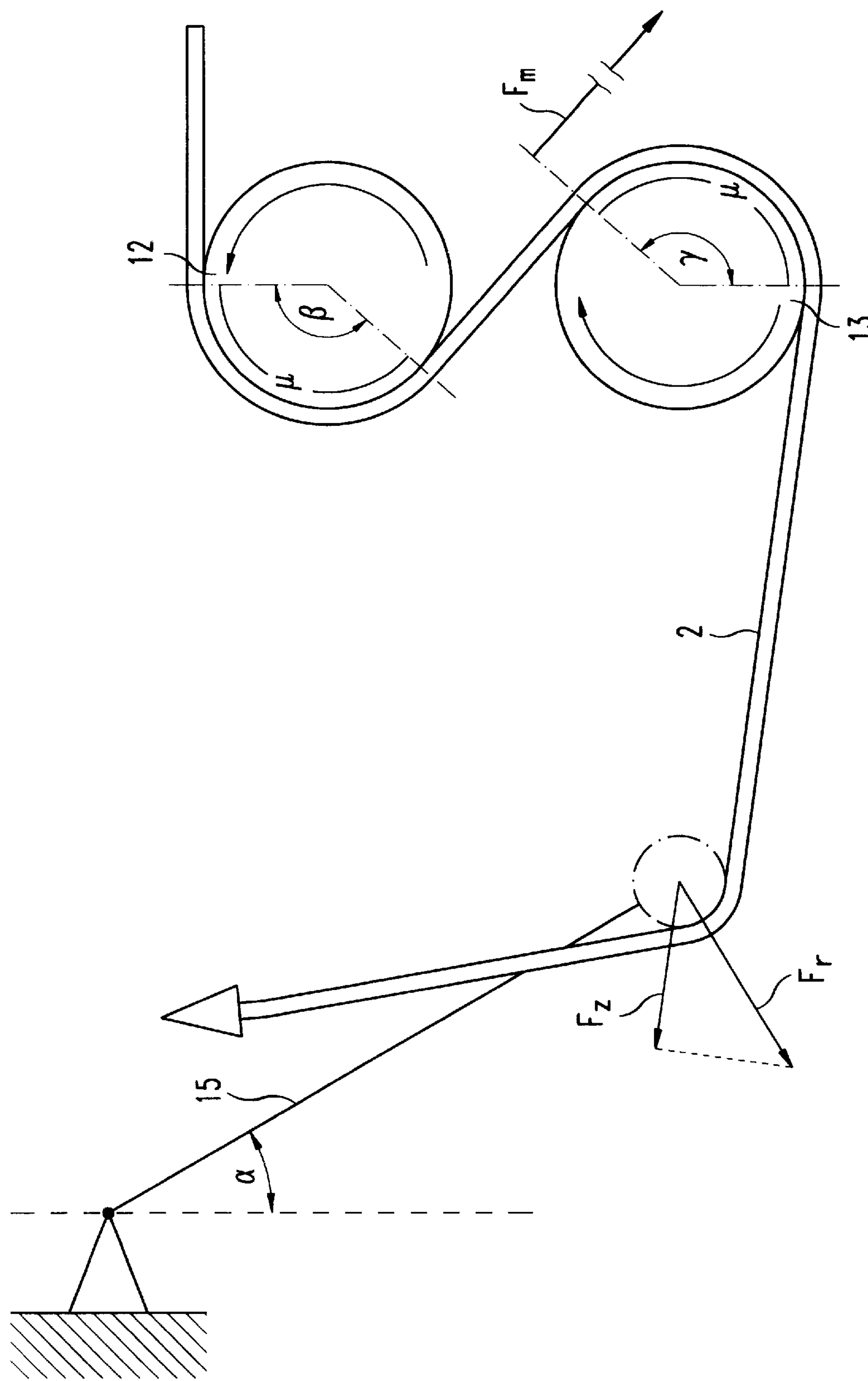
FIG. 3 shows the force relationships in the region of the paper feeding.

FIG. 3 illustrates once more the cooperation between the paper web 2, the pendulum 15 and the rollers 12 and 13. The restoring force $F_r$ exerted by the pendulum causes a tensile force $F_z$ in the paper web 2. Euler's rope friction relation establishes what carrying force $F_m$ the roller can transfer to the paper web through the roller's rotation:

$$F_m = G \cdot e^{\mu\gamma}, \text{ wherein}$$

$\mu$ represents the friction coefficient between the lining of the roller and the paper web, and $\gamma$ represents the wrap-around angle of the paper web around the roller. Depending on the operative state, wherein slippage between the friction lining and the paper web does or does not arise, the coefficient of sliding friction, or respectively, the friction coefficient is used as the basis for $\mu$.

Although the invention was described using an exemplifying embodiment in which the recording medium is formed of paper, it is clear that the invention can also be utilized with other materials. For example, the recording medium could also be formed of plastic films, plastic cards or labels which are stuck on a carrier web and can be pulled off therefrom.

In order to further stabilize the press driving, it could be provided to determine the angle excursion of the pendulum and to control one or more drive motors of the arrangement using the measurement result.

Instead of the described arrangement with the pendulum cables constructed as steel chains, a pendulum with one or more rigid axles can also be used. The effect of creating a different friction force depending on the storage unit contents can also be achieved with an adjustable spring deflection roller, wherein the spring power would decrease, the greater the storage unit contents obtained with the deflection roller were. The deflection roller would therein be flexibly mounted in a fashion similar to a compensating roller, so that it would create varying loop sizes.

The active connection between the tensile force unit and the conveyance unit could also be achieved via a separate mechanical connection (rod, cable pull), rather than via the recording medium.

Figure 4A:
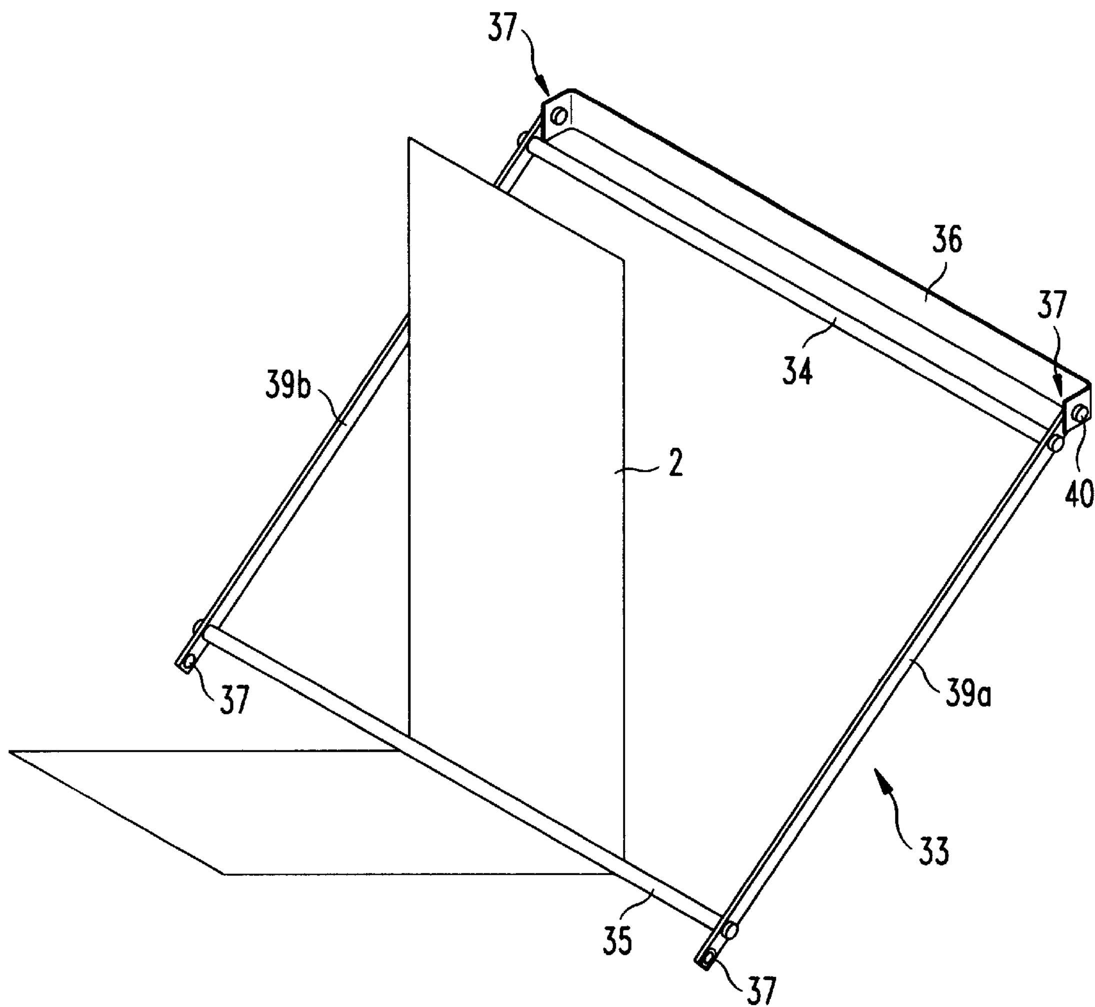
FIGS. 4*a* and 4*b* illustrate an arrangement with a rigid pendulum.
Figure 4B:
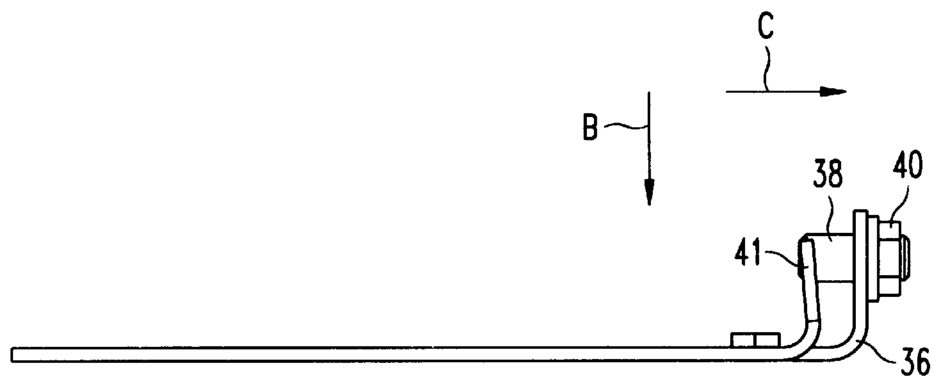

FIG. 4*a* depicts an embodiment for the pendulum which is formed of a rigid frame 33. The frame 33 includes two cross-struts 34 and 35 which can be hung across longitudinal struts 39*a*, 39*b* in an alternating fashion at an upper suspension 36 which is secured to the printer. The respective lower cross-strut then serves as a pendulum weight or as a dislocation strut for the paper web 2. The cross-strut 34 is therein heavier than the cross-strut 35. If the paper web 2 is formed of heavy paper, then the strut 34 is used as dislocation strut; with light paper, the strut 35 is used as a dislocation strut. The frame 33 comprises four suspension bore holes 37. As can be seen in FIG. 4*b*, the suspension bore holes 37 are located in longitudinal struts 39*a*, 39*b* and can be hung positively in corresponding bolts at a suspension element 36. The bolts are secured at the suspension element 36 with screws 40.

The frame 33 and the suspension element 36 are designed such that the frame 33 can be easily changed between the two working positions (cross-strut 34, or respectively, 35, up or down) without a tool, via hanging, or respectively, by rehanging at the bolts 38. For this purpose, the longitudinal struts 39 are moved in the horizontal first direction B relative to the frame 33 and then shifted in direction C—perpendicular to direction B—onto the bolts 38. If the pendulum frame 33 is then let loose, it moves into its vertical resting position. By means of a safety sheet 41 located at the suspension element 36 and running underneath the bolt 38 at a short distance, the longitudinal struts 39 of the frame 33 are guided from the resting position nearly to the horizontal alternate position or secured against slipping off of the bolts 38.

The controlling effect of the mechanical control unit—which effect feeds back onto the in-feed of paper—can also be achieved via a position variable, for example via a rod assembly, instead of via tensile forces. The position of the paper feed at the device housing could be changed via this position variable, for example, whereby different controlled wrap-around angles around the drive rollers—and thus in turn different rates of paper conveyance in the paper feed—would arise. In another variation, a controlled position modification could, for example, effect different contact forces of a sprung press roller in the paper feed. Here also, different rates of conveyance of the paper feed could be achieved, these being dependent on the mechanical control unit—and thus dependent on the fill load of the temporary storage unit. Finally, different variations described above can be combined with each other as needed, in order to guarantee a paper feed which is optimally suited to need.

Although various minor changes and modifications might be proposed by those skilled in the art, it will be understood that my wish is to include within the claims of the patent warranted hereon all such changes and modifications as reasonably come within my contribution to the art.

I claim as my invention:

1. A device for transporting and temporarily storing a web-like recording medium in a printing or copying device, comprising:

a first conveyance unit for transporting a recording medium to a temporary storage unit, and a drive mechanism for removing the recording medium from the temporary storage unit; and said temporary storage unit having a member for increasing tension on the recording medium when a loop of the recording medium in the temporary storage unit decreases, and wherein said first conveyance unit has a conveying structure arranged so that frictional engagement increases for feeding the recording medium given said increasing tension, and wherein said temporary storage unit member when said loop becomes larger provides less tension stress on the recording medium resulting in substantially no frictional engagement of the recording medium by the conveying structure in the first conveyance unit so that the first conveyance unit stops feeding the recording medium.

2. A device for transporting and temporarily storing a web-like recording medium in an electrographic printing or copying device, comprising:

a roller arrangement which feeds the recording medium to a temporary storage unit by friction; and said temporary storage unit comprising a pendulum which adjusts a loop forming in the temporary storage unit, said pendulum swinging from an approximate vertical position wherein substantially no tension is applied to the recording medium to a position away from the vertical position towards a lateral position at which increased tension is applied to the recording medium, said roller arrangement substantially stopping feed of the recording medium when the pendulum is in said approximate vertical position due to loss of friction between the recording medium and the roller arrangement.

3. The device according to claim 2 wherein the roller arrangement rotates even when the recording medium is not being fed, said roller arrangement being formed of first and second separated driven rollers which wrap around the recording medium in an S-shape, the friction imparted to the recording medium by the first and second driven rollers stopping when the temporary storage unit is filled to a prescribed level.

4. The device according to claim 3 wherein the prescribed level of filling of the temporary storage unit is defined by a loose loop which forms in the temporary storage unit when the pendulum simultaneously assumes a resting position.

5. The device according to claim 2 wherein the pendulum and the roller arrangement are in a mutual active connection with each other through the recording medium such that an excursion of the pendulum from its resting position toward a working position, results in an increasing tensile force being exerted on the recording medium so as to produce an increasing friction connection of the recording medium in the roller arrangement.

6. The device according to claim 2 including a drive mechanism arranged after the temporary storage unit in a paper transport direction, said drive mechanism feeding the recording medium to a transfer printing station in the printing or copying device.

7. The device according to claim 2 including a first motor for driving the roller arrangement and a second motor with a conveying roller arrangement for conveying the recording medium from the temporary storage unit to a transfer printing station, a speed of the recording medium at the roller arrangement during frictional engagement by the roller arrangement being greater than a speed of the recording medium at the second motor conveying roller arrangement.

8. The device according to claim 2 including a buffer for cushioning stressing forces acting on the recording medium for a short time, said stressing forces arising with excess swinging of said pendulum.

9. The device according to claim 2 including said pendulum being formed of a rigid frame with two cross-struts of different weights.

10. A device for transporting and temporarily storing a web-like recording medium in a printing or copying device, comprising:

a first conveyance unit for transporting a recording medium to a temporary storage unit, and a drive mechanism at a transfer printing station for removing the recording medium from the temporary storage unit;

said first conveyance unit frictionally engaging the recording medium for transfer of said recording medium when a tensile force of the recording medium is above a predetermined value and which disengages from said recording medium so that the recording medium is no longer driven when said tensile force falls below said predetermined value; and said temporary storage unit having a swinging member for imparting a tensile force above said predetermined value as a loop of the recording medium decreases and for imparting a tensile force below said predetermined value when said loop in said temporary storage unit increases to a configuration where feed from said first conveyance unit is no longer needed.

11. The device according to claim 10 wherein the first conveyance unit has first and second drive rollers which are spaced apart, the recording medium meandering around a portion of the first drive roller, through a gap between the first and second drive rollers, and then around a portion of the second drive roller, and wherein said tensile force causes a change in frictional driving contact between the recording medium and the first and second rollers so that a supply speed of the recording medium by the first and second rollers varies based on the changing frictional driving contact and the changing tensile force in the recording medium.

* * * * *